US007756192B2

(12) United States Patent
Akita

(10) Patent No.: US 7,756,192 B2
(45) Date of Patent: Jul. 13, 2010

(54) DESPREADING OF MODULATED SIGNALS WITH LOW NOISE

(75) Inventor: Yoneo Akita, Tokyo (JP)

(73) Assignee: Tektronix, Inc., Beaverton, OR (US)

( * ) Notice: Subject to any disclaimer, the term of this patent is extended or adjusted under 35 U.S.C. 154(b) by 724 days.

(21) Appl. No.: 11/080,205

(22) Filed: Mar. 14, 2005

(65) Prior Publication Data

US 2005/0238085 A1  Oct. 27, 2005

(30) Foreign Application Priority Data

Apr. 22, 2004  (JP) ............................... 2004-127438

(51) Int. Cl.
*H04B 1/00* (2006.01)
(52) U.S. Cl. ........................ 375/148; 375/130; 375/140
(58) Field of Classification Search ................. 375/148, 375/149
See application file for complete search history.

(56) References Cited

U.S. PATENT DOCUMENTS

| 5,579,304 | A | | 11/1996 | Sugimoto et al. | |
|---|---|---|---|---|---|
| 5,978,413 | A | * | 11/1999 | Bender | 375/149 |
| 6,137,788 | A | * | 10/2000 | Sawahashi et al. | 370/342 |
| 6,222,833 | B1 | * | 4/2001 | Seo | 370/342 |
| 6,546,043 | B1 | * | 4/2003 | Kong | 375/148 |
| 6,584,115 | B1 | * | 6/2003 | Suzuki | 370/441 |
| 6,718,162 | B1 | * | 4/2004 | Agin et al. | 455/63.1 |
| 6,999,467 | B2 | * | 2/2006 | Krauss et al. | 370/441 |
| 7,023,903 | B2 | * | 4/2006 | Karna | 375/147 |
| 7,133,435 | B2 | * | 11/2006 | Papasakellariou et al. | 375/148 |
| 7,158,558 | B2 | * | 1/2007 | Petre et al. | 375/147 |
| 7,215,934 | B2 | * | 5/2007 | van Rooyen et al. | 455/133 |
| 7,242,722 | B2 | * | 7/2007 | Krauss et al. | 375/260 |
| 7,280,585 | B2 | * | 10/2007 | Sriram et al. | 375/148 |
| 7,292,323 | B2 | * | 11/2007 | Artsyukhovich et al. | 356/73.1 |
| 7,295,597 | B2 | * | 11/2007 | Fitton et al. | 375/148 |
| 7,386,032 | B2 | * | 6/2008 | Fitton et al. | 375/147 |
| 2001/0040874 | A1 | * | 11/2001 | Saito et al. | 370/282 |

\* cited by examiner

*Primary Examiner*—Shuwang Liu
*Assistant Examiner*—Kenneth Lam
(74) *Attorney, Agent, or Firm*—Francis I. Gray; Michael A. Nelson

(57) ABSTRACT

A method of despreading modulated signals with low noise to demodulate a sum of spread signals from a base station of a mobile phone system provides the sum of spread signals to several paths. A despreading circuit in each path despreads the sum of spread signals by respective spreading codes. The despread signals are separated into channels and symbols for each channel are estimated on each path. The symbols are modulated by applicable Walsh codes corresponding to the respective channels, added and spread to produce an estimated spread signal corresponding to the spreading code for each path. Then the sum of spread signals is despread again on each path after the estimated spread signals of other paths are subtracted from the sum of spread signals so that the noise due to interference between the spreading codes is reduced.

5 Claims, 3 Drawing Sheets

DESPREADING OF MODULATED SIGNALS WITH LOW NOISE

BACKGROUND OF THE INVENTION

The present invention relates to decoding of telecommunication signals, and more particularly to despreading of modulated signals that are spread by a plurality of spreading codes for effective decoding with low noise.

IMT-1000 is an International Telecommunication Union (ITU) standard for third generation (3G) mobile telecommunications which encompasses cdma2000, UMTS (Universal Mobile Telecommunications Systems) and W-CDMA (Wideband—Code Division Multiple Access). The CDMA spread spectrum communication method is being commonly adopted by next generation mobile phone systems. FIG. 1 shows a block diagram of a base station (transmitter side) 10 that uses a plurality of spreading codes according to one of the 3GPP (Third Generation Partnership Project) standards. For simplicity, FIG. 1 shows only two channels being assigned to one spreading code, but actually 256 or more may be assigned, and the total number of channels determines the maximum number of mobile phones that the base station can support. Each mobile phone may use not only one, but a plurality of channels. If too many spreading codes are used at the base station, it increases inter-symbol interferences that make demodulation difficult. Therefore only a few spreading codes are used at each base station. The above system has an advantage in that many more channels are available at each base station relative to a system that assigns one spreading code to each base station.

Channels CH1-CH6 (21-26) in FIG. 1 provide respective digital modulated signals that are initially data modulated according to some modulation method, such as QPSK (Quadrature Phase Shift Keying), etc. The digital modulated signals are multiplied by Walsh codes (C1-C6) in respective multipliers 31-36 to make their relationships orthogonal to each other. Then adjacent Walsh-coded channel pairs are summed at respective adders 42-46, i.e., the output signal from adder 42 is a sum of digital modulated signals from channels CH1, CH2, hereinafter called "a digital modulated signal corresponding to spreading code A". The addition process does not lose any information of the digital modulated signals from channels CH1, CH2 since they are orthogonal as a result of the Walsh code multiplication. A multiplier 52 applies spectrum spreading on the sum of the digital modulated signals of channels CH1, CH2 using spreading code A. Similarly, spreading codes B, C are applied to the respective signals of other channel pairs by respective multipliers 54, 56. The resulting spread signals A, B, C are summed by an adder 58. The output signal from the adder 58, or the sum of the spread signals, is modulated by a carrier signal (60) and transmitted through an antenna 62. As described above, each base station conducts a multi-modulation process including multiplication by Walsh codes and spreading codes before the signal transmission.

The spreading codes are code series that are not relevant to the data (digital modulated signal) in the channels, and that spread the frequencies of the digital modulated signals of the channels to enhance information confidentiality and interference immunity. In the case of W-CDMA there are 8192 different spreading codes to which serial numbers 0-8191 are assigned. The spreading codes assigned to each base station for mobile phones are selected from the 8192 codes so as not to select the same codes as are assigned to adjacent base stations.

FIG. 2 shows a block diagram for a conventional receiver 70, such as contained in a mobile phone. An antenna 72 receives the transmission signal from the base station 10 and a detector 74 detects the sum of the spread signals from the received signal. A correction circuit 76 corrects sync, frequency and phase and extracts one unit necessary for demodulation. A despreading circuit 82 demodulates from the received signal a digital modulated signal including a desired channel corresponding to a spreading code. If the desired channel is channel CH2, a digital modulated signal corresponding to spreading code A is demodulated. The digital modulated signal from the despreading circuit 82 is the sum of digital modulated signals from channels CH1, CH2. A channel separator 84 separates the channels according to the applicable Walsh code. Then the mobile phone or terminal gets the digital modulated signal for the desired channel.

The despreading circuit 82 has to decide which spreading codes from among the 8192 codes are used. The IMT-1000 standard defines that the received signal includes pilot signals and information that indicates spreading code numbers, and one of the spreading code numbers is used. Then the despreading circuit 82 tries the spreading codes, corresponding to the numbers deemed to be used based on the spreading code information, one by one to determine whether the spreading code decodes the pilot signals normally in order to identify the spreading code used in the received signal. The spreading code identification process starts just after receiving the signal and is over before a conversation starts. When the base station uses a plurality of spreading codes, they have known offsets between them so that, if one spreading code is identified, other spreading codes are automatically determined.

The receiver 70 of FIG. 2 is simple and does not require much time for data processing, so it is popular when real time processing of the received signal is required, such as in a mobile terminal or phone. The spreading codes are selected to have a low correlation to each other—most of the signal components not corresponding to the desired spreading codes are eliminated.

However the spreading codes are not completely orthogonal to each other, so components of inter-symbol interference remain as noise to some extent. The noise components may cause problems when communication data rates increase and improved quality is required for the decoded signal. A measurement instrument is required to recover the original signal accurately, so it needs to eliminate the noise components to a maximum extent. The circuit shown in FIG. 2 does not provide the required level of noise elimination.

U.S. Pat. No. 5,579,304 discloses a conventional method of reducing the inter-symbol interferences when signals are received from a plurality of base stations. However the method uses cascaded interference reduction stages having complicated circuits.

As described above, some inter-symbol interferences remain since the spreading codes are not completely orthogonal. It is not a critical problem for a mobile phone as long as conversation is possible even if there is some noise. However, some applications require an accurate original signal recovery and noise is an important problem. Therefore, what is desired is to demodulate a signal before spreading while effectively eliminating inter-symbol interferences during the despreading process.

BRIEF SUMMARY OF THE INVENTION

Accordingly the present invention provides despreading for demodulating digital modulated signals before a spreading process where the digital modulated signals are derived from a sum of spread signals obtained by spreading digital modulated signals with respective spreading codes. The sum of spread signals is provided to respective paths corresponding to the spreading codes, and despread by the respective spreading codes. Based on the despread signals, symbols of the digital modulated signals are estimated. Then, estimated digital modulated signals corresponding to the spreading codes are derived from the estimated symbols. The estimated digital modulated signals are spread by the corresponding spreading codes to produce estimated spread signals. The sum of the spread signals is despread by one of the spreading codes on each path, the estimated spread signals not corresponding to the spreading code of the particular path being subtracted from the sum of spread signals. This reduces interference components due to the signal spread by the spreading codes of other paths to decrease noise and produce digital modulated signals closer to the original ones. The process may be repeated to further reduce the noise.

The objects, advantages and other novel features of the present invention are apparent from the following detailed description when read in conjunction with the appended claims and attached drawing.

DETAILED DESCRIPTION OF THE INVENTION

Figure 1:
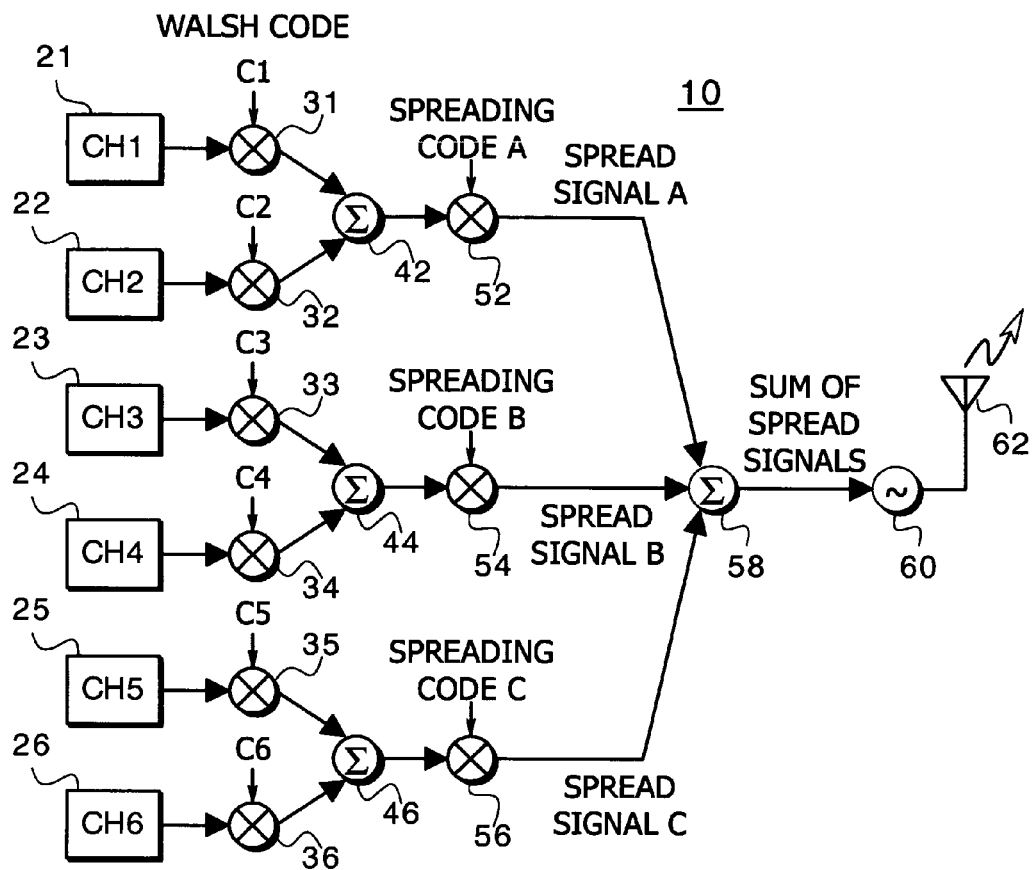
FIG. 1 is a block diagram view of a mobile telecommunications base station for transmitting spread spectrum signals according to the current state of the art.
Figure 2:
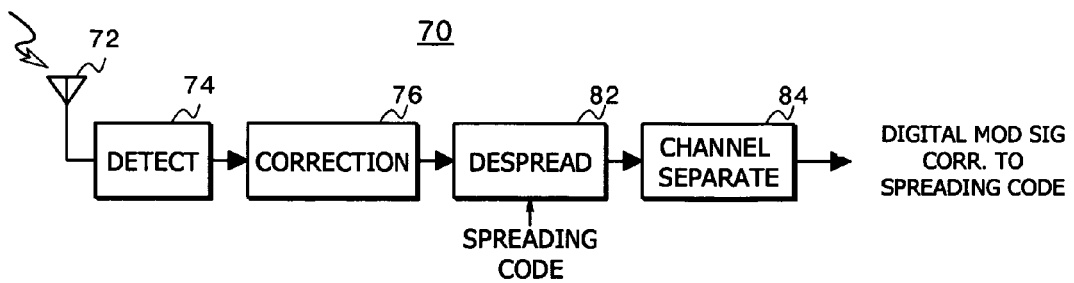
FIG. 2 is a block diagram view of a receiver for demodulating a received signal that uses spreading codes according to the current state of the art.
Figure 3:
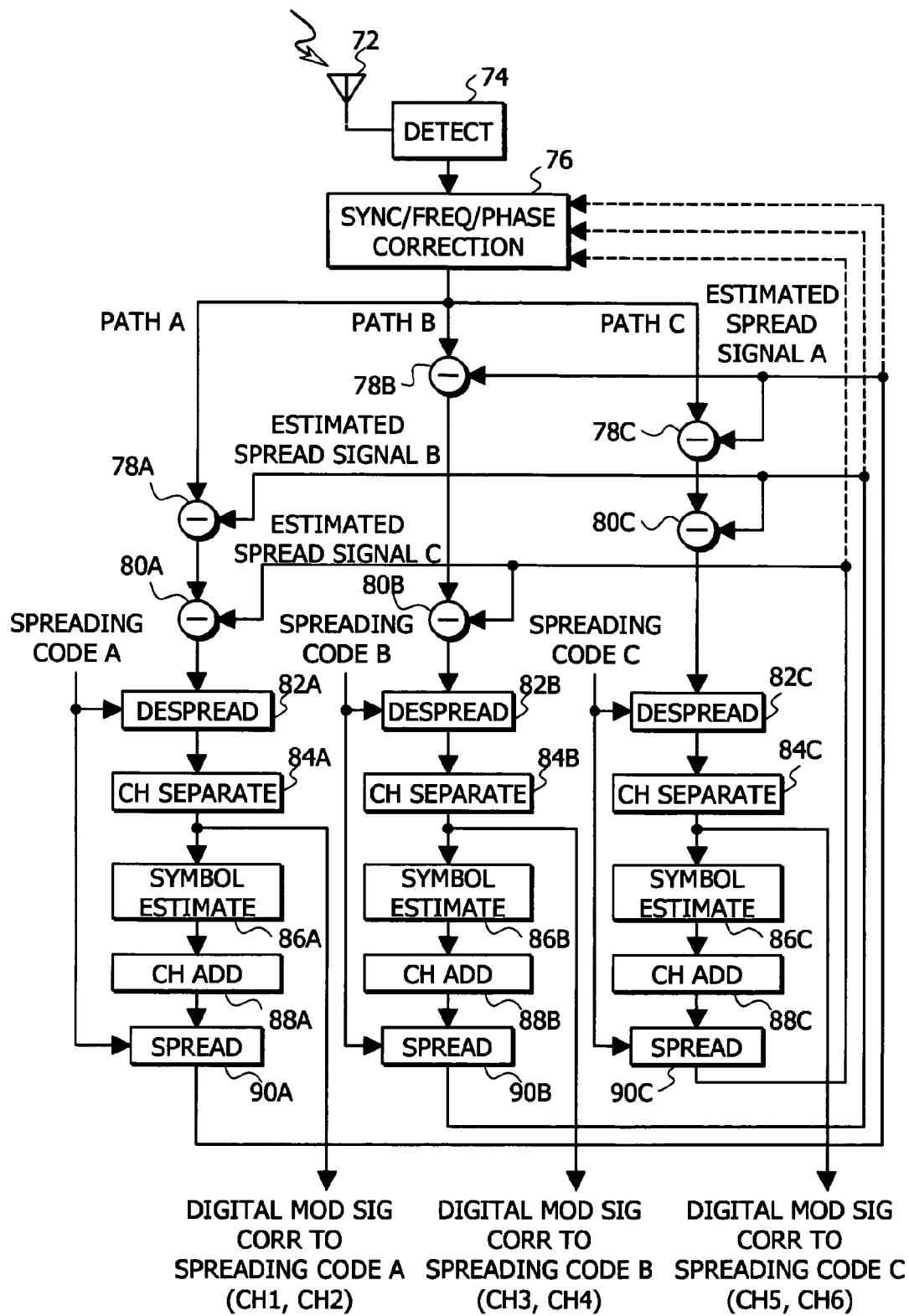
FIG. 3 is a block diagram view of a receiver for despreading according to the present invention.

In the following descriptions, corresponding blocks in different Figs. are indicated by the same numbers. The processes following channel separation are also omitted. The prior art receiver 70, as shown in FIG. 2, uses only one spreading code corresponding to a desired channel for demodulating the received signal. The present invention uses spreading codes other than the desired one included in the received signal for reducing noise during the demodulation of a modulated signal corresponding to the desired spreading code, the received signal being sent by the base station 10 shown in FIG. 1. FIG. 3 shows an example of a receiver for a system where the base station 10 uses three spreading codes, but cases using two or more than three spreading codes are similar.

Figure 4:
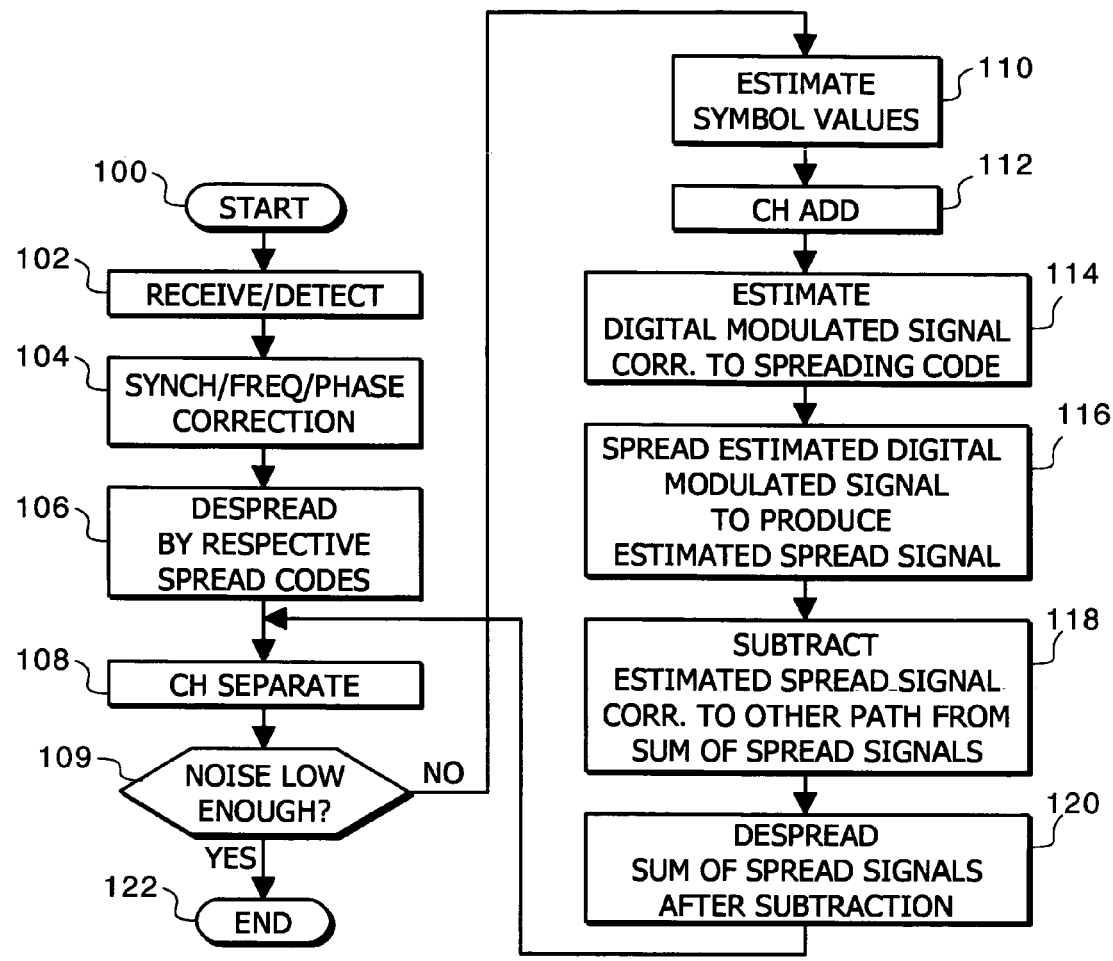
FIG. 4 is a flow chart view of a despreading method according to the present invention.

Referring now to FIGS. 3 and 4 at the start (step 100) the detector 74 detects the sum of spread signals in the signal received at the antenna 72 and provides it to the correction circuit 76 (step 102). The correction circuit 76 corrects the sync, frequency and phase of the sum of spread signals (step 104), and extracts one unit necessary for demodulation. The correction circuit 76 provides its output to three paths corresponding to spreading codes A, B, C respectively, and then to respective despreading circuits 82A, 82B, 82C (collectively described as despreading circuit 82 below) through respective subtractors 78, 80, wherein suffixes A, B, C indicate that they process signals corresponding to spreading codes A, B, C respectively. The despreading circuit 82 despreads the sum of the spread signals by the corresponding codes (step 106) to demodulate digital modulated signals before spreading corresponding to spreading codes A, B, C. The despreading circuit 82 provides the outputs to respective channel separation circuits 84 for channel separation using the applicable Walsh codes (step 108). So far the demodulation process is the same as the prior art of FIG. 2 except that a plurality of paths and spreading codes are used. Also how to determine the spreading codes A, B, C used in the received signal is the same as described above. The digital modulated signals of the respective channels obtained at this stage have noise above a user desired level so that they are judged "NO" at step 109 and the process goes to step 110.

Each channel separation circuit 84 provides the digital modulated signals to corresponding symbol estimation circuits 86 that estimate symbols of the digital modulated signal for each channel (step 110). The digital modulated signals from the channel separation circuits 84 include noise, distortions of phase and amplitude, etc., but it is a digital signal so that ideal symbols of the digital modulated signals may be estimated with relatively good accuracy by comparing the signals with thresholds (unless the signal is extremely distorted), hereafter called "estimated symbol values". The symbol estimation circuits 86 further generate estimated ideal digital modulated signals for the channels based on the estimated symbol values. The estimated ideal digital modulated signals are provided to respective channel adders 88. The channel adders 88 simulate the processes of the adders 42, 44, 46 shown in FIG. 1, i.e., channel adder 88A adds the estimated digital modulated signals of channels CH1, CH2 with the Walsh codes, obtained from the symbol estimation circuit 86A at step 112, to produce an estimated digital modulated signal corresponding to spreading code A (step 114). This process is a simulation of the conduct of the adder 42 of FIG. 1. At step 112 only effective (or using) channels are added. The channel adders 88B, 88C are similar. Spreading circuits 90 spread the signals from the respective channel adders 88 by the corresponding spreading codes to produce estimated spread signals A, B, C (step 116).

If channels CH3, CH4 are not used, the corresponding symbol estimation circuit 86B is not used for the symbol estimation process.

The subtractors 78, 80 subtract the estimated spread signals that do not correspond to the respective three paths from the sum of spread signals at step 118. For example, the subtractors 78A, 80A on path A subtract the estimated spread signals B, C that do not correspond to spreading code A from the sum of spread signals. The same processes are done on the paths B, C. This reduces interference components due to the signals spread by spreading codes for the other paths. After this process the despreading circuits 82 despread the signals again and produce the digital modulated signals that correspond to the respective spreading codes and have less noise than before.

The channel separation circuit 84 may again conduct the channel separation, and the steps 110-120 may be followed again to produce estimated spread signals again. The iterative process makes the estimated spread signals closer to the original spread signals by eliminating interference components for the other path spreading codes until the noise is low enough. If the noise level is below a user-designated level at step 109, the iterative process ends (step 122).

After the above processing the digital modulated signals of the respective channels from the channel separation circuits 84 are closer to the ideal ones. If they are fed back to the correction circuit 74, the sync, frequency and phase corrections become more accurate.

Although the invention has been disclosed in terms of the preferred embodiments disclosed herein, those skilled in the art will appreciate that modifications and improvements may be made without departing from the scope of the invention. For example, each functional block may be realized by hardware, or by software on a digital signal processor (DSP). If the hardware does not have enough speed and the signal processing of the present invention is not achievable in real time, the received signal may be digitized and stored as data in a storage means, like a hard disk drive, for subsequent processing. Because analysis by a measurement instrument does not necessarily require realtime processing, the present invention may be realized for a reasonable cost. The described embodiments process a signal transmitted as a RF signal, but the signal may be directly provided as the sum of spread signals.

Thus the present invention demodulates a spread signal that uses a plurality of spreading codes with lower noise and higher accuracy, and is suitable for higher quality communication or more accurate signal analysis.

What is claimed is:

1. An apparatus for despreading a sum of spread signals of the type having a plurality of signal processing paths for receiving the sum of spread signals that are respectively spread with different spreading codes each of which two or more channels are assigned to, each signal processing path corresponding to one of the different spreading codes comprising:

means for subtracting estimated spread signals corresponding to the other signal processing paths from the sum of spread signals to produce a modified sum of spread signals;

means for despreading the modified sum of spread signals with the corresponding spreading code to produce a despread modulated signal;

means for separating the despread modulated signal into signals that respectively correspond to the two or more channels assigned to the corresponding spreading code;

means for estimating symbol values of the signals corresponding to the two or more channels respectively;

means for producing an estimated modulated signal corresponding to the spreading code from the estimated symbol values of the two or more channels; and means for spreading the estimated modulated signal according to the spreading code to produce one of the estimated spread signals for input to the subtracting means for the other signal processing paths so that noise is minimized when a modulated signal representing a particular communication channel within the despread modulated signal is demodulated.

2. The apparatus as recited in claim 1 further comprising means for correcting sync, phase and frequency for the sum of spread signals as a function of the estimated spread signals.

3. A method comprising the steps of:

for a particular spreading code subtracting from a sum of spread signals estimated spread signals corresponding to other spreading codes within the sum of spread signals that do not correspond to the particular spreading code to produce a modified sum of spread signals for one of a plurality of signal processing paths corresponding to the particular spreading code, each signal processing path having a different spreading code that two or more channels assigned to;

despreading the modified sum of spread signals according to the particular spreading code to produce a despread modulated signal;

separating the despread modulated signal into signals that respectively correspond to the two or more channels assigned to the particular spreading code;

estimating symbol values of the signals corresponding to the two or more channels;

producing an estimated modulated signal corresponding to the spreading code from the estimated symbol values of the two or more channels; and spreading the estimated modulated signal according to the particular spreading code to produce one of the estimated spread signals for input to the subtracting step for the other signal processing paths so that noise is minimized when a modulated signal representing a particular communication channel within the despread modulated signal is demodulated.

4. The method as recited in claim 3 further comprising the step of correcting sync, phase and frequency for the sum of spread signals as a function of the estimated spread signals.

5. The method as recited in claim 4 further comprising the step of iterating the subtracting, despreading, separating, estimating, producing and spreading steps until the noise is below a specified limit.

* * * * *